Aug. 13, 1968    F. A. MURPHY    3,396,497
STRUCTURAL PANELING

Filed Oct. 19, 1964    7 Sheets-Sheet 1

INVENTOR.
FRANCIS A. MURPHY
BY McCoy, Greene,
Medert & Te Grotenhuis
ATTORNEYS

Aug. 13, 1968  F. A. MURPHY  3,396,497
STRUCTURAL PANELING
Filed Oct. 19, 1964  7 Sheets-Sheet 3

INVENTOR.
FRANCIS A. MURPHY
BY McCoy, Greene,
Medert & Te Grotenhuis
ATTORNEYS

Aug. 13, 1968 F. A. MURPHY 3,396,497
STRUCTURAL PANELING
Filed Oct. 19, 1964 7 Sheets-Sheet 4

INVENTOR.
FRANCIS A. MURPHY
BY McCoy, Greene,
Medert & Te Grotenhuis
ATTORNEYS

INVENTOR.
FRANCIS A. MURPHY

Aug. 13, 1968  F. A. MURPHY  3,396,497
STRUCTURAL PANELING

Filed Oct. 19, 1964  7 Sheets-Sheet 6

INVENTOR.
FRANCIS A. MURPHY

BY McCoy, Greene,
Medert & Te Grotenhuis
ATTORNEYS

Aug. 13, 1968     F. A. MURPHY     3,396,497
STRUCTURAL PANELING
Filed Oct. 19, 1964     7 Sheets-Sheet 7

INVENTOR.
FRANCIS A. MURPHY
BY McCoy, Greene, Medert & TeGrotenhuis
ATTORNEYS

United States Patent Office

3,396,497
Patented Aug. 13, 1968

3,396,497
STRUCTURAL PANELING
Francis A. Murphy, Rocky River, Ohio, assignor to The Tyler Company, Cleveland, Ohio, a corporation of Ohio
Filed Oct. 19, 1964, Ser. No. 404,569
26 Claims. (Cl. 52—80)

This invention relates to the art of structural paneling, and more particularly to an improved decorative structural panel of wide architectural utility, having visual depth in its facing surface, and capable of light, air and sound transmission.

Heretofore, the industry to which this invention pertains has endeavored to produce an attractive structural panel unit capable of use on vertical or horizontal surfaces or in the construction of partitions which permits the transmission of light or air or both. However, the prior structures embodied many undesirable features and failed to fulfill many requirements.

Many such structural panel units in current usage today are constructed of a translucent plastic material. These panel units lack strength and rigidity and are easily damaged. They tend to be shabby and unimpressive in appearance, and consequently are poorly suited for use in public buildings such as banks, office buildings, hotels or similar places where it is desired to create a luxurious decor. Furthermore, a substantial portion of the structural panels in use today are generally flat and two-dimensional in appearance.

Present structural panels for ceiling use are designed to be used only in conjunction with specific types of lighting fixtures. The use of these panels in redecorating or remodeling often necessitated the installation and use of such lighting fixtures. Thus, where the use of a panel may be most expedient from a structural standpoint, the ultimate cost occasioned by the requirement of special lighting means made it prohibitive.

Many prior structural panel units are unsuitable to continuously cover a large structural surface. Manufactured in standard sizes, the panel units have permanent borders or are otherwise impossible to affix side by side without obvious visible seams. Such seams mar the continuity of the surface and are often objectionable.

It has been found that where prior structural panels become damaged, repair is impractical or impossible due to their inherent construction, and the entire panel unit must be discarded and replaced. In many cases due to inability to obtain replacement panels the unsightly damaged paneling remained until it was economical to replace the entire area.

Almost without exception, structural panels employed to cover large ceiling areas require considerable additional support means when in place. Such supporting means, especially in the case of molded plastic sheet panels, mar the continuity of the surface. Even when such bracing is hidden behind the surface, it is visible in the form of shadows which detract from the perfection desired.

Many structural panels in use today achieve light transmission by means of apertures so large as to expose light bulbs or other light sources mounted behind the panel as well as the supporting means for such light sources. Still other panels are constructed of glass, which, regardless of how reinforced, can be dangerous and are often prohibited by municipal building codes.

In spite of the degree to which the art of structural paneling has developed, the present invention, by means of its unique construction, has solved the above enumerated undesirable features of the prior art and combines the features hereinafter pointed out to produce a highly functional, aesthetically appealing, and greatly improved structural panel unit.

A panel unit constructed in accordance with the teachings of the present invention has a unique three-dimensional appearance and creates an impression of richness and depth. Consequently, the present invention provides a panel unit which is most suitable and desirable as a wall or ceiling covering or as a removable partition for use in the construction of convention halls, banking facilities, office buildings, hotels and similar structures where a rich and luxurious decor is desired.

The panel units of the present invention are sturdy, durable, and less susceptible to damage than previously conceived structural panels embodyng similar features. In addition, the greater strength inherent in these panel units permits their use in the spanning of larger ceiling areas without supplementary bracing than was heretofore possible. Furthermore, such a panel unit embodies interchangeable elements which may be replaced in the event of damage, thereby avoiding the waste encountered when, as in other panels, damage to one small portion is not repairable but requires replacement of the entire panel.

The architectural panel units of the present invention are so designed as to be utilized in conjunction with any type of light fixture or source of light, thus avoiding expensive specially designed equipment. For example, they may be installed over existing windows, or they may be hung from a ceiling below existing light fixtures. Consequently, the panels of the present invention may be incorporated into a building at actually less cost than many less expensive panels. The subject structural panel units are suitable to form a continuous glowing surface without visible and unattractive junctures. Such a continuous surface may be desired to span large ceiling or wall areas requiring many separate panel units.

In the production of a structural panel unit as provided herein, a wide variety of materials may be used, including translucent plastic, wire mesh, and metal sheeting (perforated or unperforated) thus adding to the versatility and acceptability of the unit. A wide selection of materials provides a panel suited to any particular need or individual taste. By employing, for instance, different materials in a given panel structure, one may achieve different levels of room illumination with a given light source. Furthermore, where building codes prohibit the use of certain materials in overhead structures, the subject panels permit a wide selection of materials to meet any reasonable code standard without sacrifice in utility, economy or aesthetic taste.

In addition to providing a panel unit which may incorporate a wide selection of materials, the present invention contemplates an equally broad selection of units embodying varying structural features. A unit may be selected which most aptly suits the installation to be made with reasonable assurance that adjacent buildings will not have identical paneling.

The present invention lends itself readily to the manufacture and installation of an arched or domed paneled area. The use of past panel designs where uniform curving or doming was desired was difficult or impossible due to their one piece construction. The present invention overcomes this drawback because of the panel's particular three element construction which may be assembled by hand once the individual elements have been produced, obviating the costly necessity of designing new machines for an isolated installation having unique requirements.

Each panel unit constructed in accordance with the teachings of the present invention can be light diffusing. Consequently, every panel can shield viewers from directly observing the harsh glare of bare light bulbs or other unsightly hardware.

A structural panel unit made in accordance with the present invention includes a plurality of parallel longitudinal members, preferably light transmitting, which are maintained in spaced relation by means of rods or the like which extend transversely of said members, intersecting the same and serving to maintain them in rigid relative position with respect to each other. Interwoven among the rods and occupying the space between the longitudinal members are strip members which may be constructed of opaque, transparent or perforated material and take the form of plain sheets, or woven mesh.

Accordingly, it is among the objects of the present invention to provide an improved architectural structural, panel for ceilings, walls, windows, elevator cabs, and other surfaces or areas where it is desired to have a continuous attractive paneled surface.

Another object of the present invention is to provide a structural panel for use in building construction which may be made from a wide selection of materials and capable of a great variety of modifications which will be safe and will conform to the various standards of municipal building codes and fulfill diverse functional requirements and aesthetic tastes.

A further object of the subject invention is to provide a structural panel which may be easily utilized in conjunction with existing structures and light fixtures, to facilitate the economical redecoration of existing building areas.

Another object of the present invention is to provide structural panel units which may be joined to one another with a non-obvious joint, thereby making said panel units suitable to form a continuous, uninterrupted surface over a large area.

A further object of the present invention is to provide an arcuate or domed structural panel which may be readily constructed to any radius or curvature using existing manufacturing facilities regardless of the unique requirements of the installation.

Another object of the present invention is to provide a structural panel having the appearance of three-dimensional depth effecting an impressive and rich appearance for use in public places where it is desired to create luxurious surroundings.

A further object of the present invention is to provide a structural panel which is substantially rigid and capable of spanning substantial areas without supplementary braces or supports, and which is durable and resistant to damage in ordinary use.

Another object of the subject invention is to provide a structural panel which allows for the transmission of light and air therethrough and which will simultaneously conceal the light source and the appurtenances relating thereto.

These and other objects, uses and advantages of the invention will become more apparent to those skilled in the art from the following detailed description taken in conjunction with the accompanying drawings, wherein like reference characters denote corresponding parts throughout the several views, and wherein.

Referring now to the drawings and more particularly to FIGURES 1 to 4 inclusive, there is illustrated a preferred form of decorative structural panel 10 constructed in accordance with the present invention, and including a plurality of longitudinally extending members 11, which are rigidly connected together in spaced relation by transversely extending rods 12 thereby defining channels for the reception of strip members broadly indicated by the numeral 13.

Figure 1:
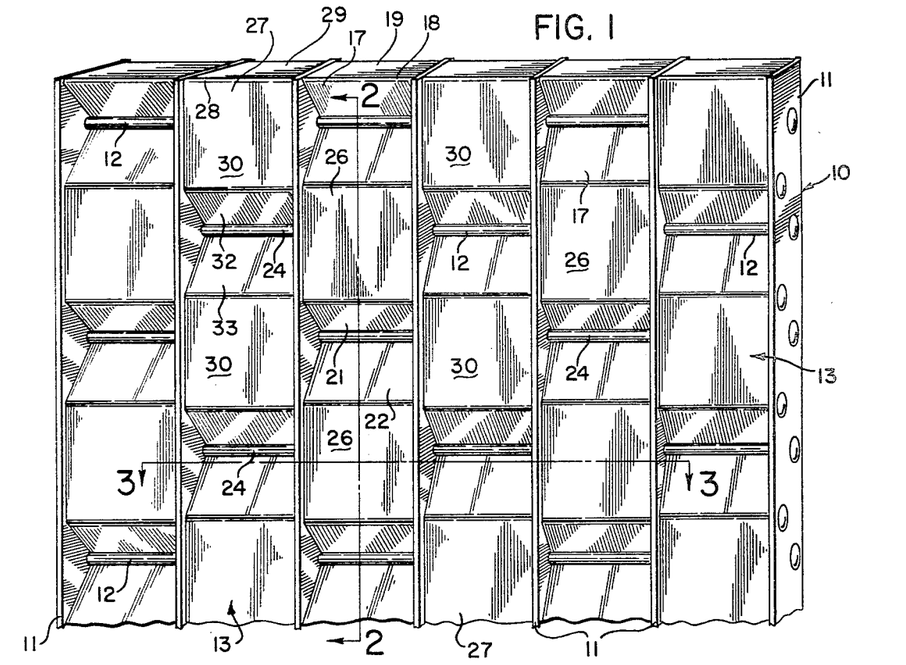
FIGURE 1 is a fragmentary perspective view of a structural panel constructed in accordance with this invention, wherein the longitudinally extending members are composed of a translucent material and the strip members are composed of an opaque material.
Figure 2:
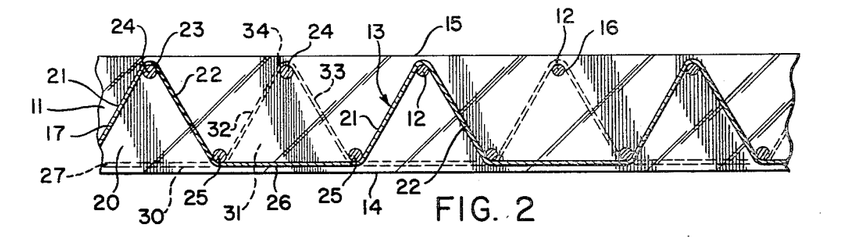
FIGURE 2 is a longitudinal sectional view taken along the line 2—2 of FIGURE 1.
Figure 3:
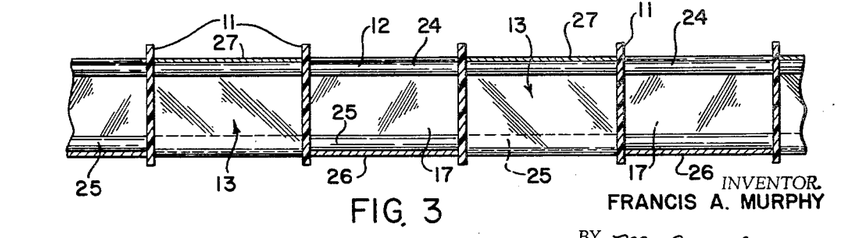
FIGURE 3 is a transverse sectional view taken along the line 3—3 of FIGURE 1.

The longitudinal members 11 are substantially rectangular in cross-section and arranged in spaced parallel planes, with the longitudinal edge surfaces 14 on one side defining one plane, and the longitudinal edge surfaces 15 on the other side defining a second plane spaced therefrom, both of said planes being substantially parallel. Said longitudinal members 11 are adapted to transmit light therethrough, being made of a material which is transparent or translucent. The members 11 adjacent their opposed longitudinal edges are formed with apertures 16 for the reception of the transversely extending rods 12 which secure the members in fixed spaced relation.

The strip members 13 mounted in the channel or space formed between adjacent longitudinal members 11 may be preformed prior to incorporation into the panel unit assembly. In forming the strip member 17 as shown in FIGURES 1 and 2, an initial bend is made at 18 adjacent edge 14 leaving an upwardly extending angulated end portion 19 which is secured in the end of the frame of the panel unit by suitable means (not shown). The strip member 17 is bent toward the opposite edge 15 of the longitudinal members 11 to form an offset area 20 triangular in cross-section having leg portions 21 and 22 with the apex thereof 23 encompassing the transverse rod 24 positioned adjacent the edge 15. The strip 17 then passes under a rod member 25 positioned adjacent the edge 14 of the member 11 and continues parallel to such edge, forming a flat area 26 and then passing under the next succeeding rod 25 adjacent the edge 14. The foregoing formation is repeated throughout the length of strip member 17 to form successive triangular offset areas 20 and flat areas 26. Strip member 27 is formed with an initial bend at 28 leaving an angulated end portion 29 which is secured in the frame of the panel unit by any suitable means (not shown). The strip 27 then continues parallel to the longitudinal edge 14 of longitudinal member 11, forming a flat area 30 and then passing under the first encountered rod member 25 adjacent edge 14 of member 11. Strip member 27 is then bent upward toward the opposite edge 15 of the longitudinal members 11 to form an offset area 31, triangular in cross-section, having leg portions 32 and 33 with the apex 34 thereof encompassing the transverse rod 24 positioned adjacent edge 15 of longitudinal members 11. The strip member 27 then passes beneath the rod 25 adjacent edge 14 of longitudinal member 11 and the foregoing formation is repeated throughout the length of strip member 27 to form successive triangular offset areas 31 and flat areas 30. Adjacent strip members 17 and 27 are arranged so that the triangular offset portions 20 of strip 17 are aligned with the flat areas 30 of the strip 27. Thus portions of the longitudinal member therebetween are exposed on opposite sides of the panel unit.

The transverse rods 24 and 25 extend through the apertures 16 in the longitudinal members 11, and fit snugly into the angles formed when strip members 17 and 27 are bent to provide the triangular offset areas 20 and 31. Said transversely extending rod members serve to maintain the longitudinal members 11 and strip members 17 and 27 in fixed assembled relationship. In constructing the panel unit the longitudinal members 11 and strip members 17 and 27 are alternately stacked on the rod members 24 and 25 and secured together by any suitable means such as riveting the ends of the rods or threading the same and applying a threaded member thereon. The transverse rod members may be of any suitable material and of any desired cross-sectional shape, and though such members are preferably rigid, they may be flexible.

Figure 4:
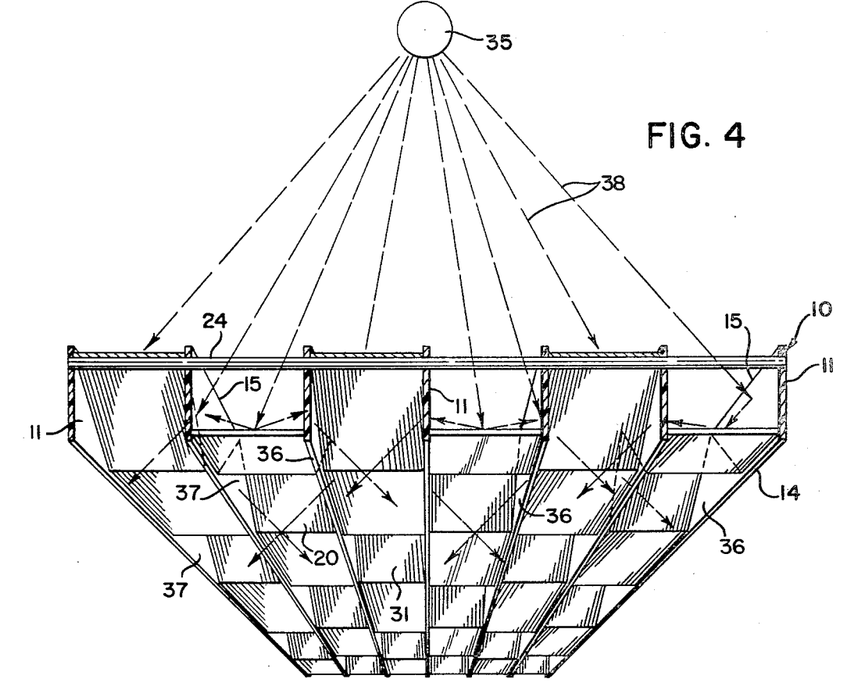
FIGURE 4 is a perspective view of a panel section with a light source disposed thereabove and having lines indicating the path of light rays throuhg the panel.

In FIGURE 4 the structural panel 10, shown in detail in FIGURES 1 to 3 inclusive is illustrated in functional relationship with a suitable light source 35 positioned above that side of panel unit 10 wherein lie edges 15 of longitudinal members 11. As hereinbefore set forth adjacent longitudinal members 11 have opposed triangular surface portions 36 and 37 defined by the spaced triangular offset areas 20 and 31 which are exposed to opposite sides of the panel unit thereby providing areas for the transmission of light from one side of the panel to the other. Light rays 38 emanating from light source 35 which strike the triangular portions 36 and 37 of longitudinal members 11 pass therethrough and emerge into offset areas 20 and 31 and are directed downwardly therefrom. Thus it is a feature of a panel unit 10 constructed in accordance with the present invention, that strip members 13 mounted in the channels defined by adjacent members 11 are not coplanar, and the configuration and arrangement of the strip members 13 provide areas thereof which are exposed to opposite sides of the panel unit 10, through which light may pass from one side of the panel 10 to the other.

Figure 5:
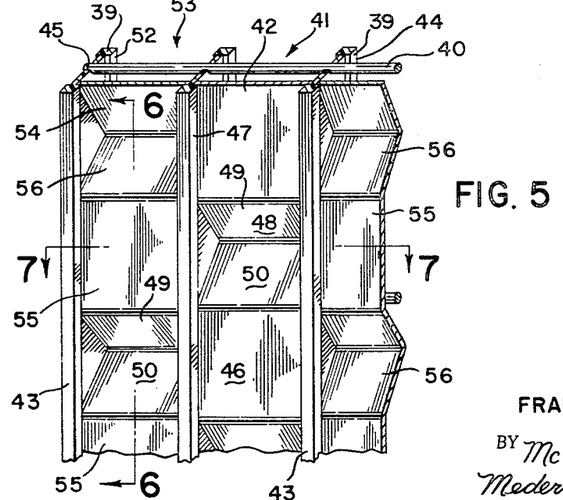
FIGURE 5 is a fragmentary perspective view similar to FIGURE 1 showing a modified form of the invention wherein the longitudinal members are I-shaped in cross-section.
Figure 6:
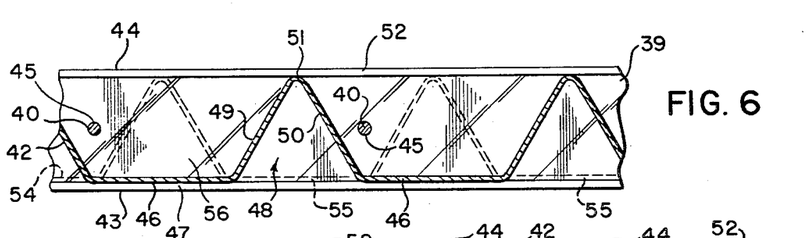
FIGURE 6 is a longitudinal sectional view taken on the line 6—6 of FIGURE 5.
Figure 7:
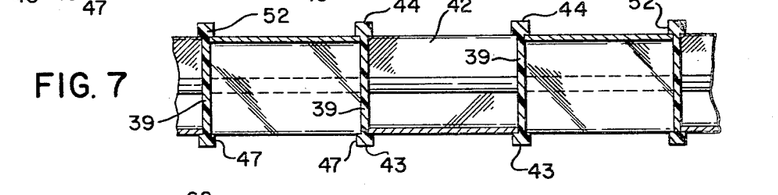
FIGURE 7 is a transverse sectional view taken on the line 7—7 of FIGURE 5.

FIGURES 5, 6 and 7 illustrate the decorative structural panel unit of FIGURE 1 wherein a modified construction is employed in securing the elements thereof in assembled relation and wherein a plurality of longitudinally extending members 39, rigidly connected in spaced relation by transversely extending rod members 40, define channels 41 for the reception of strip members 42. The longitudinally extending members 39 are of a transparent or translucent material, and said strip members 42 are of an opaque metallic material.

The longitudinal members 39 are substantially I-shaped in cross-section and arranged in spaced parallel planes, with the longitudinal edge surfaces 43 on one side defining one plane and the longitudinal edge surfaces 44 on the other side defining a second plane spaced therefrom, both of said planes being substantially parallel. Said longitudinal members 39 are arranged to allow the transmission of light through portions thereof. A row of apertures 45 are formed in the members 39 equidistant from edges 43 and 44 for the reception of the transversely extending rods 40 which secure said members in fixed spaced relation.

The strip members 42 are disposed in the channels 41 formed between adjacent longitudinal members 39 and may be preformed prior to incorporation into the panel unit assembly. A portion of strip member 42 extending parallel to the edge 43 of longitudinal member 39 forms a flat area 46. The edge of strip member 42 forming flat area 46 engages above the outwardly extending flange 47 formed on the edge 43. Strip member 42 is then bent upward toward edge 44 of longitudinal member 39 to form an offset area 48 triangular in cross-section having leg portions 49 and 50 with the apex 51 thereof abutting below the outwardly extending flange 52 of the edge 44 of longitudinal member 39. The foregoing strip formation is repeated throughout the length thereof to form successive triangular offset areas 48 and flat areas 46. Mounted in adjacent channel 53 is strip member 54, which is formed with successive flat areas 55 and triangular offset areas 56 which are arranged to be adjacent the offset area 48 and flat area 46 of the adjacent strip member 42, respectively. The outwardly extending flanges 47 and 52 formed on the opposite edges 43 and 44 of the longitudinal members 39 serve to maintain the strip members in assembled position when transverse rods 40 are in place within the apertures 45. The strip members further serve to space adjacent longitudinal members in parallel relation. The flanged longitudinal members when assembled with strip members therebetween minimize the number of transverse rods required to produce the panel unit. Furthermore in this modification the rods are hidden from the lower side of the panel unit and thus add to its appearance.

Figures 8, 10:
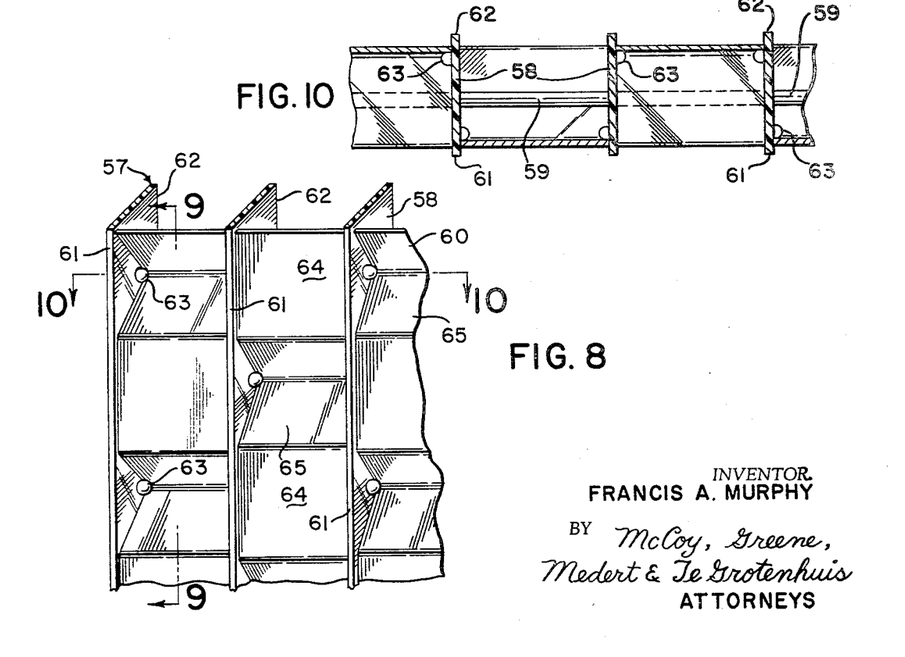
FIGURE 8 is a fragmentary perspective view of a further modification of the invention, the longitudinal members being provided with bosses to fix the position of the strip members.
FIGURE 10 is a transverse sectional view taken on the line 10—10 of FIGURE 8.
Figure 9:
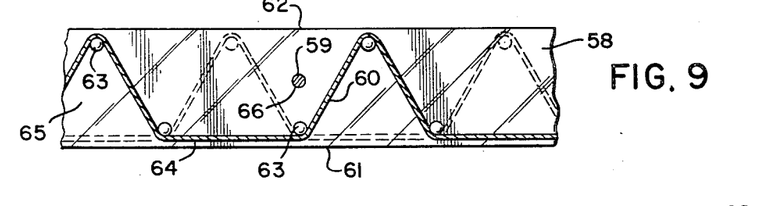
FIGURE 9 is a longitudinal sectional view taken on the line 9—9 of FIGURE 8.

FIGURES 8, 9 and 10 illustrate a further modification of the invention wherein a structural panel unit 57 includes a plurality of longitudinally extending members 58, which are rigidly connected in spaced relation by transversely extending means 59 thereby defining channels for the reception of strip members 60. The strip members 60 are of an opaque metallic material, whereas the longitudinal members 58 are made of a transparent or translucent material.

The longitudinal members 58 are substantially rectangular in cross section having opposed longitudinal edges 61 and 62. Similar to the structure disclosed in FIGURES 5, 6 and 7 the members 58 are secured together by the rods 59 which are disposed substantially intermediate the longitudinal edges 61 and 62. Adjacent the edges 61 and 62 and projecting outwardly from the opposite surfaces of the longitudinal members 58 are bosses 63 which are formed integrally with the members 58 and serve to engage the strip member 60 and position the same within the channel defined by the members 58.

The strip members 60 disposed in the channel between adjacent longitudinal members 58 may be preformed prior to incorporation into a panel unit assembly. The strip members are similar in formation to those disclosed in FIGURES 5, 6 and 7 having alternate flat areas 64 and triangular offset areas 65. Adjacent strip members 60 are so arranged that the flat area 64 of one strip is transversely aligned with the triangular offset area 65 of the other throughout the extent of the panel unit. The bosses 63 formed on the longitudinal members 58 engage the strip members at the apex of the triangular offset area 65 and at the included angle between the triangular offset areas and the flat areas 64, forming a support for the strip member at these points.

The transverse rods 59 extend through apertures 66 in the longitudinal members 58 and serve to maintain the longitudinal members 58 and strip members 60 in fixed relationship. Affixing means (not shown), such as screws or bolts, inserted in the ends of transverse rods 59 serve to hold the members 58 and 60 in secure abutting relation.

Figure 11:
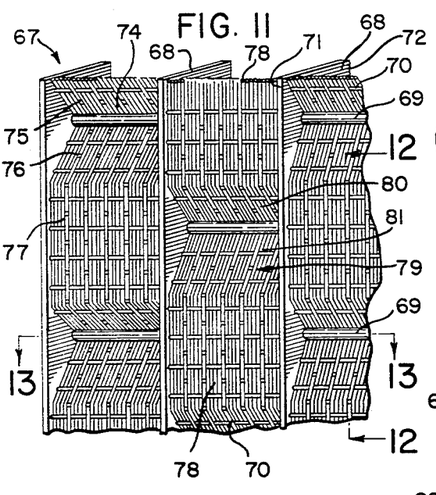
FIGURE 11 is a fragmentary perspective view similar to FIGURE 1, but showing a modified form of the invention wherein the strip members are composed of mesh material.
Figure 12:
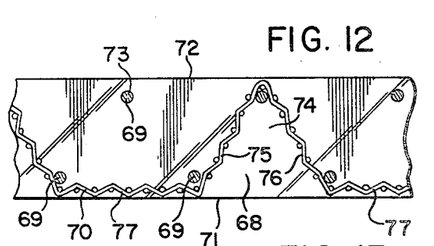
FIGURE 12 is a longitudinal sectional view taken along the line 12—12 of FIGURE 11.
Figure 13:
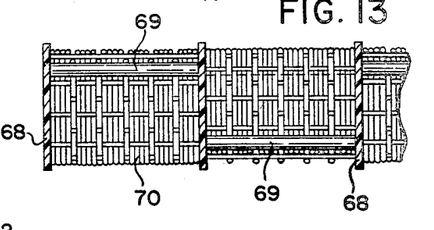
FIGURE 13 is a transverse sectional view taken along the line 13—13 of FIGURE 11.

In FIGURES 11, 12 and 13 there is illustrated another modified decorative structural panel 67 constructed in accordance with the present invention having a plurality of longitudinally extending members 68 made of transparent or translucent material rigidly connected in spaced relation by transversely extending rods 69 thereby defining channels for the reception of strip members 70 which are of metallic mesh.

The longitudinal members 68 are similar to the members 11 of FIGURE 1 and arranged in spaced vertical parallel planes with the longitudinal edge surfaces 71 defining one horizontal plane and the longitudinal edge surfaces 72 defining a second plane parallel to and spaced therefrom. The members 68 adjacent their opposed longitudinal edges are formed with apertures 73 for the reception of the transversely extending rods 69 which secure said members in fixed spaced relation.

The strip members 70 are disposed in the channel formed between adjacent longitudinal members 68 and may be preformed prior to incorporation into the panel unit assembly. One of the strip members 70 begins flush with the ends of longitudinal members 68 and is initially bent toward the edge 72 of longitudinal member 68 to form an offset area 74 triangular in cross-section having leg portions 75 and 76 with the apex thereof encompassing one of the transverse rods 69 positioned adjacent the edge 72. The strip 70 then passes under a rod member positioned adjacent the edge 71 of the member 68 and continues parallel to such edge forming a flat area 77 and then passing under the next succeeding rod 69 adjacent the edge 71 (FIGURE 12). The foregoing procedure is repeated throughout the length of strip member 70 to form successive angulated offset and flat areas. The next adjacent strip member 70 begins flush with the ends of longitudinal members 68 and extends parallel to edge 71 of member 68 forming a flat area 78. This strip member 70 then passes under the first rod 69 adjacent edge 71 and is bent toward edge 72 of longitudinal member 68 to form an offset area 79 triangular in cross section having leg portions 80 and 81 with the apex thereof encompassing the transverse rod 69 positioned adjacent edge 72. Thus the strip member is formed into successive flat and angulated areas which are alternately arranged with respect to the same in the adjacent strip member.

The transverse rods 69 extend through apertures 73 in the longitudinal members 68 and fit snugly into the angle area formed when strip members 70 are bent to form flat areas such as 77 and triangular offset areas such as 74 and serve to maintain the longitudinal members 68 and strip members 70 in fixed relationship.

Figure 14:
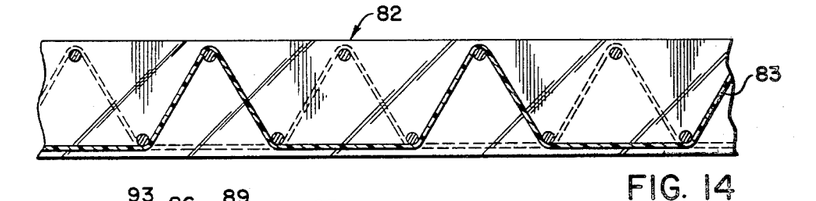
FIGURE 14 is a fragmentary sectional view of a further modification of the invention wherein the entire panel, except for the rod members, is composed of translucent material.
Figure 15:
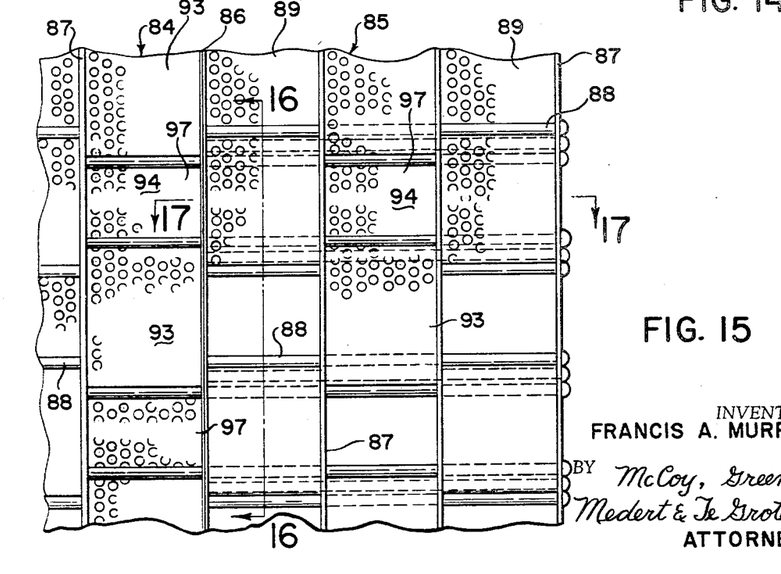
FIGURE 15 is a fragmentary front plan view of a further modification of the invention whereby the woven strip members form alternating offset areas rectangular in cross-section in the face of the panel, and where two panel units are shown joined at a non-obvious seam, the woven members and the longitudinal members being constructed of perforated sheet metal.
Figure 16:
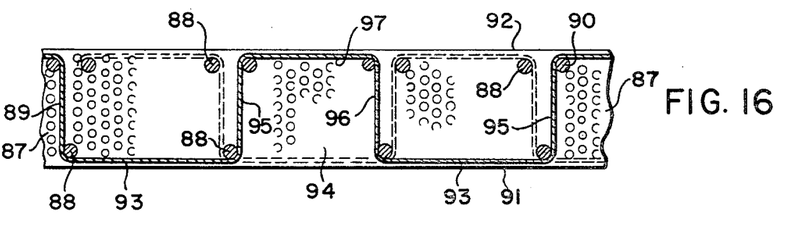
FIGURE 16 is a longitudinal sectional view taken along the line 16—16 of FIGURE 15.
Figure 17:
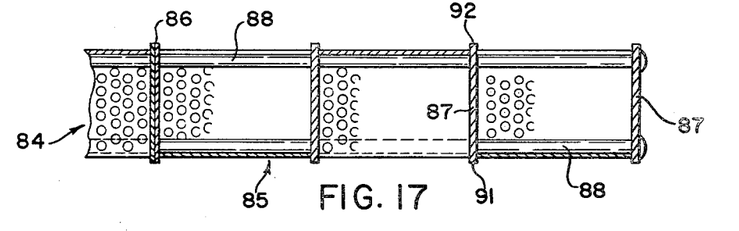
FIGURE 17 is a transverse sectional view taken along the line 17—17 of FIGURE 15.

In FIGURE 14 there is shown a further modified decorative structural panel 82 which is similar in all details of construction with the exception that the strip members 83 are made of a translucent or transparent material.

With reference to FIGURES 15, 16, 17 and 18 there are illustrated two modified decorative structural panel units 84 and 85 embodying the present invention and joined at a non-obvious juncture 86. The panel units 84 and 85 each comprise a plurality of longitudinally extending members 87 constructed of perforated sheet metal rigidly connected in spaced relation by transversely extending rods 88, defining channels for the reception of strip members 89, also of perforated sheet metal.

The longitudinal members 87 are substantially rectangular in cross-section and have apertures 90 formed therein adjacent the longitudinal edges 91 and 92 for the reception of transverse rods 88. The strip members 89 disposed between adjacent longitudinal members 87 may be preformed prior to incorporation into the panel unit assembly. Strip member 89 extends parallel to edge 91 of longitudinal member 87 passing beneath spaced rods 88 and forming the flat area 93, then is bent towards edge 92 to form an offset area 94 rectangular in cross-section and having side portions 95 and 96 and a top portion 97 extending parallel to edge 92 with the corners of said rectangular offset area 94 encompassing spaced rods 88 adjacent edge 92. The foregoing procedure is repeated throughout the length of strip member 89 to form successive rectangular offset areas 94 and flat areas 93. In assembling the strip members the offset areas of alternate members are aligned to provide areas in the longitudinal members which are exposed to opposite sides of the panel unit.

Figure 18:
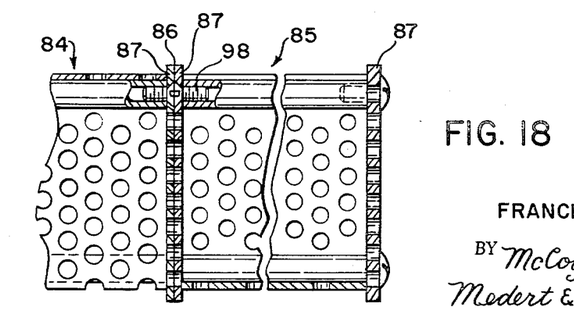
FIGURE 18 is a fragmentary transverse sectional view similar to FIGURE 17 but on a larger scale showing in detail the juncture between adjacent panel units.

Panel units 84 and 85 (FIGURE 18) are joined as at 86 with a non-obvious joint characterized by embodying longitudinal members 87 of reduced thickness, preferably one-half. When two panel units 84 and 85 are joined along the length of their contiguous longitudinal members, the combined thickness of said members equals the thickness of the remaining longitudinal members of the panel so that the various flat rectangular surfaces 93 remain in diagonal alignment across the joint 86. The affixing means 98 for securing the longitudinal members of the joint 86 do not protrude beyond the lateral surface of the members 87. As shown in FIGURE 18 an arrangement is employed whereby flat-head bolts 98 are countersunk in members 87.

FIGURES 19 through 25 are fragmentary longitudinal section views through modified structural panel units embodying the present invention. In each modification the longitudinal members are translucent or transparent and are substantially identical. The configuration of the intermediate strip members and relative position of the transverse tie rods vary among the individual structures illustrated.

Figure 19:
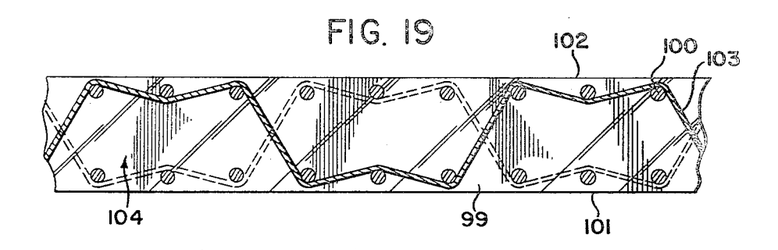
FIGURE 19 is a fragmentary longitudinal sectional view of a further modification wherein the offset areas are substantially M-shaped in cross-section.

In FIGURE 19, the longitudinally extending members 99 are rigidly connected in spaced relation by aligned rods 100 disposed adjacent the longitudinal edges 101 and 102 of the members 99. Beginning at edge 101 the strip member 103 extends toward edge 102 and is woven among three successive rods adjacent edge 102 and thence toward the edge 101 where it is woven among the next three rods adjacent the edge 101. The next strip follows the same procedure, however the beginning point is at edge 102.

Figure 20:
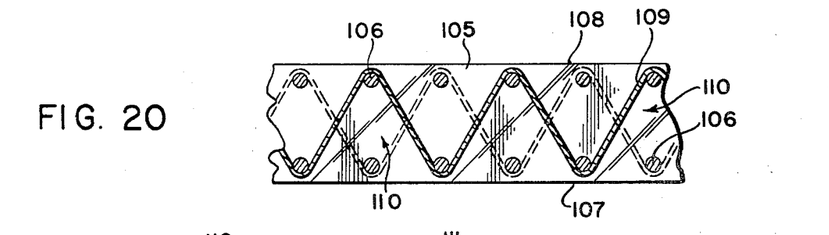
FIGURE 20 is a fragmentary longitudinal sectional view of another modification wherein the offset areas are triangular in cross-section.

In FIGURE 20, the longitudinally extending members 105 are rigidly connected in spaced relation by transversely extending aligned rods 106 disposed adjacent longitudinal edges 107 and 108 of members 105. The strip members 109 disposed between the members 105 are laced through rod members 106 positioned at the opposite edges of the members 105 thus forming triangular offset areas 110. The strip members are so arranged that the offset areas of adjacent strips are longitudinally spaced and the areas of alternate strip members are in alignment.

Figure 21:
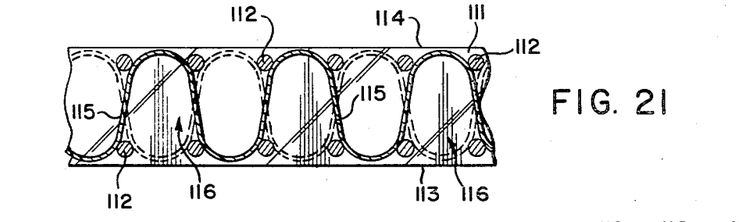
FIGURES 21, 22, 23 and 24 are fragmentary longitudinal sectional views of further modifications wherein the offset areas are arcuate in cross-section.

In FIGURE 21, the longitudinally extending members 111 are rigidly connected in spaced relation by transversely extending aligned rods 112 disposed adjacent longitudinal edges 113 and 114 of members 111. The strip members 115 disposed between the members 111 are sinuately curved and along the outer perimeters of their constituent curves abut the rod members 112. Thus, the strip members 115 form arcuate offset areas 116, which are so arranged that the offset areas 116 of adjacent strips are longitudinally spaced to expose portions of the longitudinal members to opposite sides of the panel.

Figure 22:
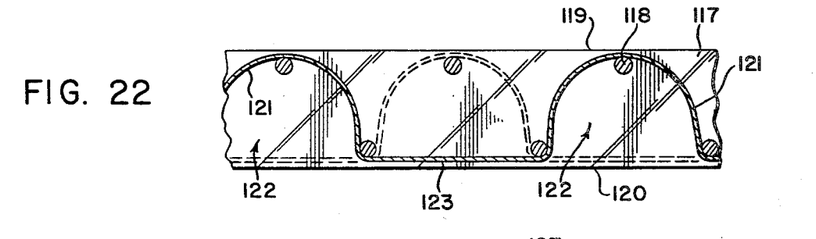

In FIGURE 2, the longitudinally extending members 117 are rigidly connected in spaced relation by the transversely extending rods 118 disposed adjacent longitudinal edges 119 and 120 of members 117. Beginning at edge 120 and disposed between longitudinal members 117, strip member 121 extends toward edge 119 to form an arcuate offset area 122, passing over rod 118 adjacent edge 119. The strip member 121 then continues toward edge 120 and passes beneath the two successive rods 118 disposed adjacent edge 120 thus forming a flat area 123. Adjacent strip members 121 are so arranged that the offset areas 122 of one strip are transversely aligned with the flat areas 123 of the other strip.

Figure 23:
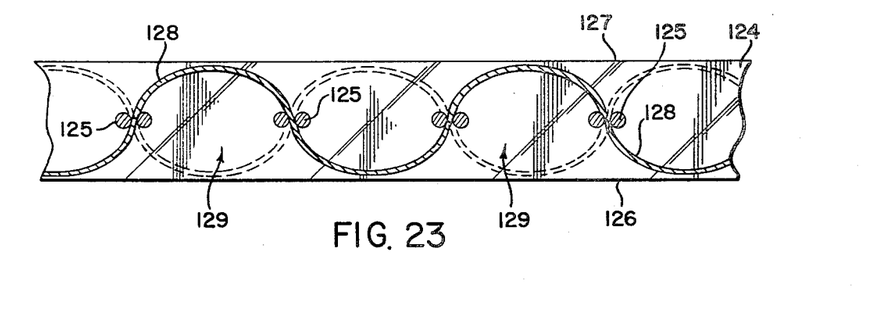

In FIGURE 23, the longitudinal extending members 124 are rigidly connected in spaced relation by paired transversely extending rods 125 disposed midway between edges 126 and 127 of longitudinal members 124. Strip members 128, disposed between longitudinal members 124, are sinuately curved and at every point of inflection thereon, pass abuttingly between paired rod members 125. Thus, the strip members 128 form arcuate offset areas 129, which are so arranged that the offset areas 129 of adjacent strips are longitudinally spaced providing areas of the members 124 which are exposed to opposite sides of the panel.

Figure 24:
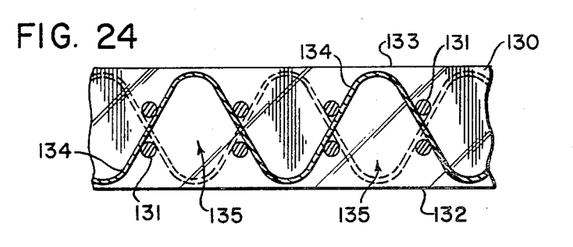

In FIGURE 24, the longitudinally extending members 130 are rigidly connected in spaced relation by vertically aligned transversely extending rods 131 disposed adjacent a line centrally located between edges 132 and 133 of longitudinal members 130. Strip members 134, disposed between the longitudinal members 130, are sinuately curved and abuttingly pass between vertically aligned pairs of transverse rods. Thus, the strip members 134 form arcuate offset areas 135, and are so arranged that the offset areas 135 of adjacent strips are longitudinally spaced, and the offset areas 135 of alternate strips are transversely aligned.

Figure 25:
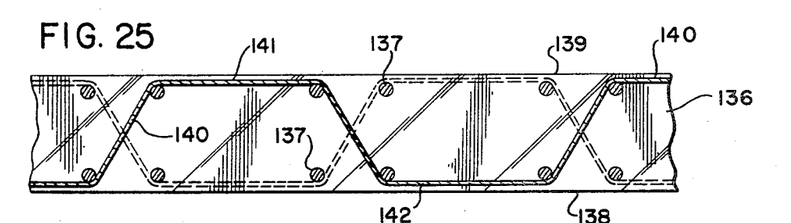
FIGURE 25 is a fragmentary longitudinal sectional view of a further modification wherein the offset areas are trapezoidal in cross-section.

In FIGURE 25, the longitudinally extending members 136 are rigidly connected in spaced relation by vertically aligned transversely extending rods 137 positioned adjacent opposite edges 138 and 139 of members 136. Beginning at edge 138 and disposed between longitudinal members 136, strip member 140 extends toward edge 139, then passes over two successive rods 137 adjacent edge 139 to form an upper flat area 141. The strip member 140 is then angulated toward edge 138 whereupon it passes under the next two rods 137 adjacent edge 138 to form a lower flat area 142. Other strip members 140 are formed similarly and are arranged so that the upper flat areas 141 are transversely aligned with the lower flat areas 142 of adjacent strips, and the upper flat areas 141 of alternate strips are transversely aligned.

Figure 26:
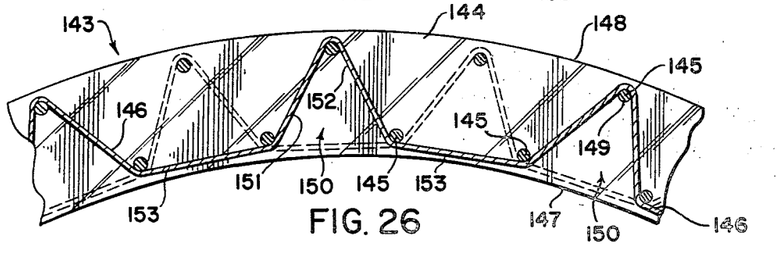
FIGURE 26 is a fragmentary sectional view of a further modification wherein an arcuate structural panel is constructed in accordance with this invention.

FIGURE 26 illustrates a modified decorative structural panel 143 constructed in accordance with the present invention including a plurality of longituidinally extending arcuate members 144 which are rigidly connected in spaced relation by transversely extending rods 145 thereby defining arcuate channels for the reception of strip members 146. Said strip members 146 are of an opaque metallic material and the longitudinal members 144 are of a transparent or translucent material.

The longitudinal members 144 are substantially rectangular in cross-section and arranged in spaced parallel planes, with the longitudinal edge surfaces 147 defining one arcuate surface and with the longitudinal edge surfaces 148 defining a second arcuate surface spaced therefrom, said surfaces being substantially parallel. The longitudinal members 144 permit the passage of light therethrough. Adjacent the opposed longitudinal edges of the members 144 are formed apertures 149 for the reception of the transversely extending rods 145 which secure said members in fixed spaced relation.

The strip members 146 are disposed in the space between adjacent longitudinal members 144 and may be performed prior to incorporation into the panel unit assembly. Beginning at the edge 147 the strip member 146 extends upwardly toward edge 148 of longitudinal member 144 to form an offset area 150 triangular in cross-section having leg portions 151 and 152 with the apex thereof encompassing one of the transverse rods 145 positioned adjacent the edge 148. Strip member 146 then passes beneath transverse rod 145 positioned adjacent edge 147 and continues adjacent edge 147 forming a flat area 153. Strip member 146 then passes beneath transverse rod 145 positioned adjacent edge 147 and the foregoing procedure is repeated throughout the length of strip member 146 forming successive triangular offset areas 150 and flat areas 153. Other strip members 146 are arranged so that triangular offset areas 150 of adjacent strip members are longitudinally spaced, thus providing portions of the longitudinal members 144 which are exposed to opposite sides of the panel unit.

Thus, aesthetically appealing arcuate structural panels are formed having greater inherent strength than planar panels and being suitable to span large areas without supplementary bracing.

A domed structural panel unit (not shown) may be constructed in a similar manner to the arcuate structural panel, such domed structural panel being formed by replacing the straight rods 145 of the arcuate panel 143 with arcuate rods of suitable curvature.

Figure 27:
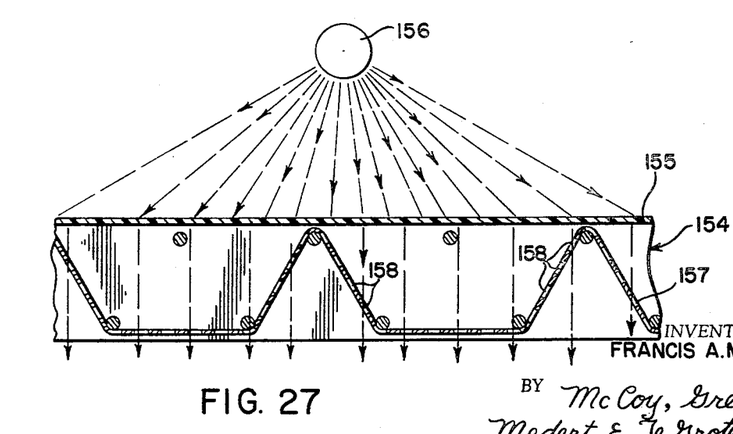
FIGURE 27 is a fragmentary sectional view of a structural panel constructed in accordance with this invention and embodying large perforations in an otherwise opaque woven strip member, and where diffusion of the light is caused by means of a translucent sheet of plastic material inserted between the strip member and the light source.

FIGURE 27 illustrates a structural panel 154 embodying the present invention having a light diffusing translucent panel 155 disposed between structural panel 154 and the light source 156. Strip members 157 of the panel contain apertures 158 sufficiently large to transmit light directly therethrough. This translucent sheet 155 diffuses the light emanating from light source 156. Where desired, the translucent sheet 155 may be colored to obtain desired effects in the decor of the environment in which the panel is used.

Having thus described my invention, what I desire to obtain by Letters Patent is covered in the appended claims.

I claim:

1. A decorative structural panel unit comprising a plurality of longitudinally extending members disposed in parallel planes and capable of transmitting light therethrough, means extending transversely of said members and serving to maintain said members in fixed spaced relation, and pre-formed longitudinal strip members mounted in the space defined by adjacent longitudinal extending members and coextensive therewith, adjacent strip members being relatively arranged so that portions of said longitudinally extending members are exposed on opposite sides of said panel unit thus providing for the transmission of light through said panel unit.

2. A structural panel unit according to claim 1 wherein the longitudinally extending members are of a translucent material and the strip members are of an opaque material.

3. A structural panel unit according to claim 1 wherein the longitudinally extending members are of a translucent material and the strip members are of a transparent material.

4. A structural panel unit according to claim 1 wherein the longitudinally extending members and the strip members are of a translucent material.

5. A structural panel unit according to claim 1 wherein the longitudinally extending members are of a translucent material and the strip members are perforated throughout.

6. A structural panel unit according to claim 1 wherein the longitudinally extending members are of a translucent material and the strip members are of a mesh material.

7. A decorative structural panel unit comprising a plurality of longitudinally extending members positioned adjacent one another in parallel planes and capable of transmitting light therethrough, a plurality of rod members extending transversely of said longitudinally extending members and serving to maintain said members in fixed spaced relation, and strip members occupying the channel defined by adjacent longitudinally extending members and extending substantially the full length of said members, the strip members in adjacent channels arranged to expose spaced portions of the longitudinally extending members to the opposite faces of the panel unit.

8. A structural panel unit according to claim 7 wherein the longitudinally extending members are of a transparent material and the strip members are of an opaque material.

9. A structural panel unit according to claim 7 wherein the longitudinally extending members are of a transparent material and the strip members of a translucent material.

10. A structural panel unit according to claim 7 wherein the longitudinally extending members and the strip members are of a transparent material.

11. A structural panel unit according to claim 7 wherein the longitudinally extending members are of a transparent material and the strip members are perforated throughout.

12. A structural panel unit according to claim 7 wherein the longitudinally extending members are of a transparent material and the strip members are of a mesh material.

13. A decorative structural panel unit comprising a plurality of longitudinally extending members having opposed surfaces extending in parallel planes and capable of transmitting light therethrough, a plurality of rigid means intersecting said members and serving to maintain said members in fixed spaced relation, and a plurality of pre-formed strip members occupying the space between said members, said strip members with respect to one longitudinal edge of said longitudinally extending members being formed with spaced angulated portions connected by flat portions, the flat portions of alternate strip members, being arranged in transverse alignment throughout the panel unit.

14. A structural panel unit according to claim 13 wherein the longitudinally extending members are perforated throughout and the strip members are of an opaque material.

15. A structural panel unit according to claim 13 wherein the longitudinally extending members are perforated throughout and the strip members are of a translucent material.

16. A structural panel unit according to claim 13 wherein the longitudinally extending members are perforated throughout and the strip members are of a transparent material.

17. A structural panel unit according to claim 13 wherein the longitudinally extending members and the strip members are perforated throughout.

18. A structural panel unit according to claim 13 wherein the longitudinally extending members are perforated throughout and the strip members are of a mesh material.

19. A decorative structure panel unit comprising a plurality of longitudinally extending members disposed in parallel planes and capable of transmitting light therethrough, longitudinal preformed strip members mounted in the space defined by adjacent longitudinally extending members, adjacent strip members being relatively arranged so that portions of the longitudinal extending members are exposed on opposite sides of the panel unit thus providing for the transmission of light through the panel unit, and means for maintaining said longitudinally extending members and said strip members in assembled relation.

20. A structural panel unit according to claim 19 wherein the longitudinally extending members are of an opaque material and the strip members are of a mesh material.

21. A structural panel unit according to claim 19 wherein the longitudinally extending members are of a translucent material and the strip members are of a mesh material.

22. A structural panel unit according to claim 19 wherein the longitudinally extending members are of a transparent material and the strip members are of a mesh material.

23. A structural panel unit according to claim 19 wherein the longitudinally extending members are of a perforated material and the strip members are mesh throughout.

24. A decorative structural panel unit comprising a plurality of longitudinally extending members disposed in parallel planes and capable of transmitting light therethrough, a plurality of strip members having portions angulated with respect to the longitudinal edges of said longitudinally extending members and occupying the space between and extending substantially the full length of said longitudinally extending members, corresponding angulated portions of succcessive strip members being non-parallel thus providing for the transmission of light through the panel unit, and means serving to maintain said longitudinally extending members and said strip members in assembled relation.

25. A decorative arcuate structural panel unit comprising a plurality of longitudinally extending arcuate members positioned adjacent one another and having top and bottom longitudinal edges which define parallel arcuate surfaces and having side surfaces which lie in parallel planes, said members capable of transmitting light therethrough, a plurality of rigid means extending transversely of said members and serving to maintain said members in fixed spaced relation, and strip members woven throughout said transversely extending means and occupying the space between and extending substantially the full length of said arcuate members, adjacent strip members being relatively arranged so that portions of the longitudinally extending members are exposed on opposite sides of the panel unit.

26. A decorative domed structural panel unit comprising a plurality of longitudinally extending arcuate members positioned adjacent one another with the plane surfaces of said arcuate members lying in parallel planes and with the top and bottom edges of said arcuate members defining parallel arcuate surfaces, said arcuate members capable of transmitting light therethrough, a plurality of arcuate rigid means extending transversely to and intersecting said members and serving to maintain said members in fixed spaced relation, and strip members woven throughout said transversely extending means and occupying the space between and extending substantially the full length of said members, portions of alternate strip members being arranged in alignment to provide light transmitting areas in said longitudinally extending members.

References Cited
UNITED STATES PATENTS

| | | | |
|---|---|---|---|
| 2,139,005 | 12/1938 | Doane | 240—78 |
| 2,745,001 | 5/1956 | Guth | 240—9 X |
| 2,837,632 | 6/1958 | Lipscomb | 240—78 |
| 2,990,923 | 7/1961 | Macias-Sarria | 52—666 X |

JOHN E. MURTAGH, *Primary Examiner.*